(12) United States Patent
Pirtle

(10) Patent No.: US 10,047,203 B2
(45) Date of Patent: Aug. 14, 2018

(54) HIGH PERFORMANCE CAST POWER STRETCH FILMS WITH ENHANCED APPLICATION AND END-USE PROPERTIES

(71) Applicant: Paragon Films, Inc., Broken Arrow, OK (US)

(72) Inventor: Shaun Eugene Pirtle, Coweta, OK (US)

(73) Assignee: PARAGON FILMS, INC., Broken Arrow, OK (US)

( * ) Notice: Subject to any disclaimer, the term of this patent is extended or adjusted under 35 U.S.C. 154(b) by 0 days.

(21) Appl. No.: 14/551,673

(22) Filed: Nov. 24, 2014

(65) Prior Publication Data

US 2015/0148492 A1 May 28, 2015

Related U.S. Application Data

(60) Provisional application No. 61/907,658, filed on Nov. 22, 2013.

(51) Int. Cl.
| | |
|---|---|
| *C08J 5/18* | (2006.01) |
| *C08L 23/10* | (2006.01) |
| *C08L 23/04* | (2006.01) |

(52) U.S. Cl.
CPC ............ *C08J 5/18* (2013.01); *C08L 23/04* (2013.01); *C08L 23/10* (2013.01); *C08J 2323/06* (2013.01); *C08J 2423/06* (2013.01); *C08L 2201/10* (2013.01); *C08L 2203/16* (2013.01); *C08L 2205/025* (2013.01); *C08L 2205/035* (2013.01); *C08L 2207/066* (2013.01); *C08L 2207/07* (2013.01)

(58) Field of Classification Search
CPC ...... C08J 5/18; C08J 2423/06; C08J 2323/06; C08L 23/04; C08L 23/10; C08L 2201/10; C08L 2203/16; C08L 2205/025; C08L 2205/035; C08L 2207/066; C08L 2207/07
See application file for complete search history.

(56) References Cited

U.S. PATENT DOCUMENTS

| | | | |
|---|---|---|---|
| 2005/0037219 A1 | 2/2005 | Ohlsson et al. | |
| 2007/0260016 A1* | 11/2007 | Best et al. | ............ B32B 27/32 525/240 |

FOREIGN PATENT DOCUMENTS

| | | | | |
|---|---|---|---|---|
| EP | 1312624 A1 | 5/2003 | | |
| WO | WO 98/44011 | * 10/1998 | ............ | C08F 210/16 |
| WO | 01/92405 A1 | 12/2001 | | |
| WO | 2015/077711 A1 | 5/2015 | | |

OTHER PUBLICATIONS

International Search Report of the International Searching Authority issued in the corresponding PCT International application No. PCT/US2014/067131, dated Apr. 2, 2015, 3 pages.
Witten Opinion of the International Searching Authority issued in the corresponding PCT International Application No. PCT/US2014/067131, 5 pages.
International Preliminary Report on Patentability Chapter I issued in the corresponding PCT International Application No. PCT/US2014/067131, dated May 24, 2016, 6 pages.

* cited by examiner

*Primary Examiner* — Nathan M Nutter
(74) *Attorney, Agent, or Firm* — Raymond R. Ferrera; Adams and Reese LLP

(57) ABSTRACT

A stretch film including at least a first layer and a second layer, in which the first layer includes a metallocene linear low density polyethylene (m-LLDPE) with incorporated long chain branching resin and a lower density m-LLDPE resin; and the second layer includes a lower melt index m-LLDPE resin.

15 Claims, 2 Drawing Sheets

HIGH PERFORMANCE CAST POWER STRETCH FILMS WITH ENHANCED APPLICATION AND END-USE PROPERTIES

FIELD

The present invention relates generally to compositions of and methods for producing high performance cast power stretch films with enhanced properties of load containment force, puncture resistance, and tear propagation resistance. In certain non-limiting, example embodiments, the invention relates to compositions of stretch films that utilize a metallocene linear low density polyethylene (m-LLDPE) with incorporated long chain branching resin and a lower density m-LLDPE resin in at least one layer of the film, and at least one additional layer of the film comprising a lower melt index m-LLDPE resin.

BACKGROUND

Stretch films are widely used in a variety of bundling and packaging applications. For example, high extensibility machine-applied cast power stretch films (i.e., machine films) are commonly used to secure bulky loads such as boxes, merchandise, produce, equipment, parts, and other similar items on pallets. Typical end-user requirements include high extensibility (greater than 350% elongation at break), resistance to failure (both during and after application), and a high load containment force to the palletized product without the potential for deformation. These properties are all needed while maintaining proper load integrity.

The proper level of containment force applied to the load ensures that the load remains properly secured to the pallet. The "load containment force" is best explained as the residual level of force applied to the load after the film has been allowed to relax for a prescribed length of time. In order to increase the load containment force of a conventional machine film, an end-user has the option to use more film, either by wrapping additional layers of film around a load, or selecting a thicker film. Alternatively, an end-user has the option of stretching the film to a point near its ultimate elongation point. However, stretching a film until it is near its ultimate elongation point imparts high levels of stress and orientation to the film. As a result, the film is vulnerable to defects, abuse, and excessive stretching and is more likely to fail.

Other means have been employed to achieve a higher load containment force without the use of thicker films or additional layers of film. These products typically require the incorporation of either a linear low density polyethylene (LLDPE) of increased modulus (i.e. density) or highly branched, low density polyethylene (LDPE). When either of these methods are employed to increase the load containment force of a film, there is a corresponding decrease in puncture and tear propagation resistance.

Furthermore, metallocene linear low density polyethylene (m-LLDPE) resins are used in producing films. However, m-LLDPE resins with a melt index (MI) of less than 2.0 (g/10 min. @190° C. and 2.16 kg) are typically not compatible for cast power stretch films, due to their lack of elongation and difficulty in processing.

Except for cling purposes on external layers, lower density m-LLDPE resins (less than about 0.915 g/cc) are not typically used in power stretch films, because they lack modulus. Lower density m-LLDPE resins can provide puncture resistance and toughness for a film, but the load holding force is insufficient because they are soft and yield easily. Ziegler-Natta (ZN) based resins below a 0.915 g/cc density are identified by the ultra-low (ULDPE) or very-low (VLDPE) descriptor. The difference between m-LLDPE resin and ZN-LLDPE resin is due to the distribution of the comonomer into the ethylene backbone. Metallocene resins typically have a much narrower molecular weight distribution, and more uniformly insert the comonomer, so at the same density, they have less extractables than their ZN counterparts.

On the other hand, lower melt index m-LLDPE resins can provide load holding force and toughness, but do not have sufficient elongation and are prone to failure.

Next, m-LLDPE with incorporated long chain branching resins can provide increased stretch resistance and failure from tear propagation, but they have relatively poor elongation properties due to the long chain branching (compared to a typical LLDPE which inherently lacks long chain branching) With regards to the long chain branching portion of the polymer, the long branches or arms do not fold or unfold quickly compared to other resins. Therefore, these polymers behave differently under stress and during relaxation.

While separate properties of a film, puncture resistance and tear propagation are interdependent in maintaining the integrity of the palletized load. During the stretching and orienting of the film prior to the application of the film to the load, the film must be resistant to holes and tear propagation in order to be delivered to the palletized load without failure. Even if a hole or tear is present, the film must be designed to resist any significant propagation which would result in film breakage and termination of the process. Even films that are designed to be highly puncture resistant are subjected to tears and holes during and after the wrapping process due to the pallet itself, the product(s) being wrapped, and during the material handling process.

There is, therefore, a long-standing yet unmet need for improved compositions of high performance cast power stretch films with high extensibility, resistance to failure, and load containment force. There is a further unmet need for methods of producing such improved stretch films.

SUMMARY

A stretch film including at least two layers is provided, in which one of the layers includes a metallocene linear low density polyethylene (m-LLDPE) with incorporated long chain branching resin and a lower density m-LLDPE resin; and the other of the at least two layers includes a lower melt index m-LLDPE resin.

BRIEF DESCRIPTION OF THE DRAWINGS

For a further understanding of the nature, objects, and advantages of the present invention, reference should be had to the followed description, read in conjunction with the following drawings, wherein like reference numerals denote like elements and wherein.

DETAILED DESCRIPTION

Figure 1:
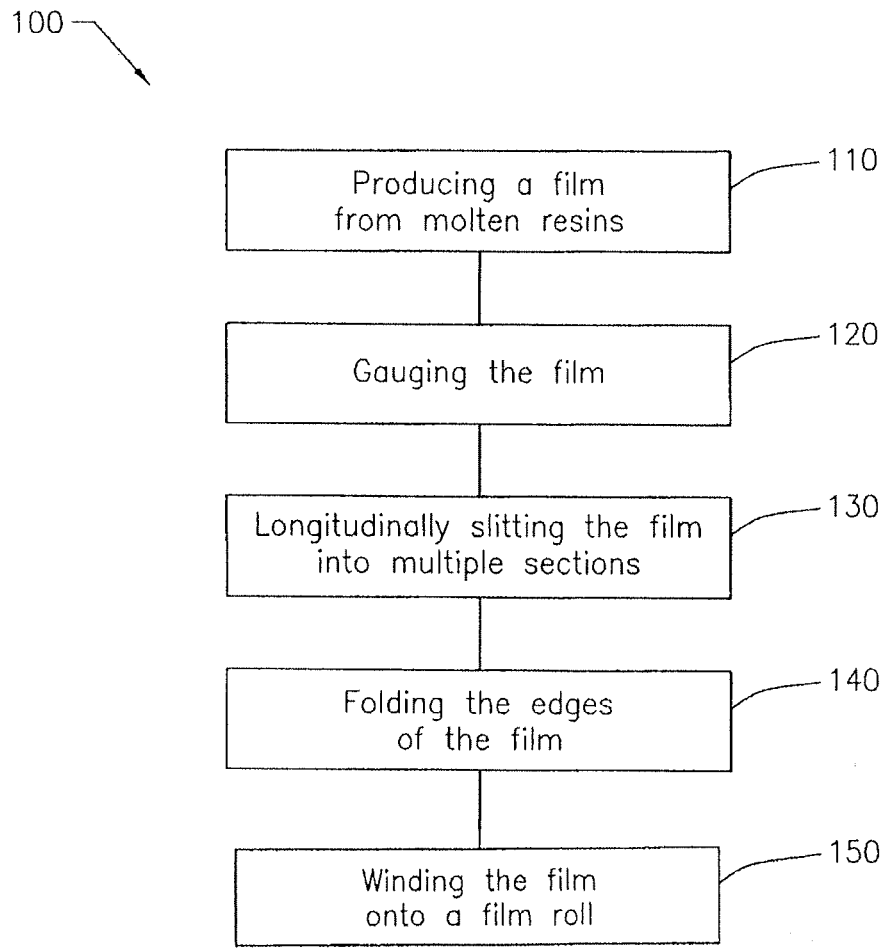
FIG. 1 illustrates the steps for producing oriented cast power stretch film in-process, according to certain embodiments.

The following description is not to be taken in a limiting sense, but is made merely for the purpose of illustrating example embodiments.

According to example embodiments, a cast power stretch film that utilizes a metallocene linear low density polyethylene (m-LLDPE) with incorporated long chain branching (LCB) resin blended with a lower density m-LLDPE resin (preferably at or below about 0.915 g/cc) is provided.

In some embodiments, the m-LLDPE with LCB resin is ENABLE™ resin or AFFINITY™ resin.

In certain embodiments, the film comprises multiple layers, with a discrete layer of the film comprising an m-LLDPE with LCB resin blended with a lower density m-LLDPE resin.

In other example embodiments, another of the film's layers comprises a lower MI m-LLDPE resin. According to example embodiments, the melt index (MI) of the lower MI m-LLDPE resin is equal to or less than about 1.8 g/10 min. @190° C. and 2.16 kg.

In example embodiments, a discrete layer of film comprises about 20% by weight of m-LLDPE with LCB resin, and about 80% by weight of lower density m-LLDPE resin. In still further embodiments, the discrete layer comprises about 50% of the total film weight.

In yet other example embodiments, the m-LLDPE with LCB and lower density m-LLDPE resins are blended with at least one other resin chosen from the group consisting of polyethylenes, polyethylene copolymers, polypropylenes, and polypropylene copolymers.

In certain embodiments, the film comprises multiple layers, with a discrete layer comprising m-LLDPE with LCB resin, lower density m-LLDPE resin, and at least one other resin chosen from the group consisting of polyethylenes, polyethylene copolymers, polypropylenes, and polypropylene copolymers. According to still further embodiments, the majority percentage by weight of the discrete layer is the m-LLDPE with LCB resin and the lower density m-LLDPE resin (ranging from about 50% to about 95%), while the minority percentage by weight is the "other" resin or resins (ranging from about 5% to about 50%) blended therewith. In still further embodiments, the m-LLDPE with LCB resin and the lower density m-LLDPE resin comprises about 80% by weight of the discrete layer, and the "other" resin(s) are about 20% by weight of the discrete layer.

According to still further embodiments, an additional discrete layer of the film comprises a lower melt index m-LLDPE resin. In example embodiments, the MI of the lower melt index m-LLDPE resin is less than or equal to about 1.8 (g/10 min. @190° C. and 2.16 kg).

In yet other example embodiments, a layer of a multiple layer film comprises lower MI m-LLDPE resin blended with at least one other resin chosen from the group consisting of polyethylenes, polyethylene copolymers, polypropylenes, and polypropylene copolymers.

According to still further embodiments, the "other" resin or resins range from about 0% to about 50% of the total weight of the additional layer comprising the lower MI m-LLDPE resin.

According to example embodiments, films containing m-LLDPE with LCB blended with a lower density m-LLDPE resin are produced, which provide improved performance with respect to load containment force, tear resistance, and puncture resistance.

In still other embodiments, the incorporation of a lower melt index m-LLDPE resin in at least one of the layers of the film enhances the performance properties of the film over conventional machine films.

According to example embodiments, utilizing an m-LLDPE with LCB resin blended with a lower density m-LLDPE resin in at least one discrete layer, in combination with at least one additional layer of a lower MI m-LLDPE resin improves the performance properties of load containment, puncture resistance, and tear resistance.

In still further embodiments, when compared to conventional machine films on a gauge-by-gauge basis, the disclosed composition provides a film with improved of performance properties.

According to example embodiments, the film comprises one layer. In other embodiments, the film comprises multiple layers, and the composition of each layer varies depending on the required application.

According to still further embodiments, resins used to produce still other additional film layers include, but are not limited to, an m-LLDPE with LCB resin, conventional m-LLDPE, Ziegler-Natta catalyzed linear low density polyethylene (zn-LLDPE), polyethylenes, polyethylene copolymers, polyethylene terpolymers, polyethylene blends, polypropylenes, metallocene catalyzed polypropylenes, polypropylene copolymers, and blends thereof According to example embodiments, the film comprises more than two layers. In such embodiments, at least one of the internal layers comprises m-LLDPE with LCB resin and a lower density m-LLDPE resin. In still further embodiments, the thickness of the internal layer varies from about 5% to about 70% of the total film thickness, with a preferred thickness of about 50%.

According to further embodiments, the melt index of the m-LLDPE with LCB resin used in at least one of the internal layers ranges from about 0.2 to about 8.0 (g/10 min. @190° C.), with a preferred melt index ranging from about 0.3 to about 3.0 (g/10 min. @190° C.). In alternative embodiments, the preferred melt index is about 0.5 (g/10 min. @190° C.). In still other embodiments, the density of the m-LLDPE with LCB resin ranges from about 0.900 g/cc to about 0.940 g/cc, with a preferred density of about 0.920 g/cc.

In still further embodiments, the MI of the lower density m-LLDPE resin used in at least one of the internal layers ranges from about 1.0 to about 8.0 (g/10 min. @190° C.), with a preferred melt index ranging from about 2.0 to about 6.0 (g/10 min. @190° C.). In alternative embodiments, the preferred melt index is about 3.5 (g/10 min. @190° C.).

According to further example embodiments, the density of the lower density m-LLDPE resin used in the internal layer ranges from about 0.900 g/cc to about 0.940 g/cc, with a preferred density of about 0.912 g/cc.

In further example embodiments, at least one of the remaining layers adjacent to the m-LLDPE with LCB resin layer comprises a lower melt index m-LLDPE resin.

According to example embodiments, the MI of the lower melt index m-LLDPE resin ranges from about 0.2 to about 6.0 (g/10 min @190° C.), with a preferred melt index ranging from about 0.5 to about 3.0 (g/10 min. @190° C.). In other example embodiments, the MI of the lower MI m-LLDPE resin is less than or equal to about 1.8 (g/10 min. @ 190° C.). In alternative embodiments, the preferred melt index is about 1.5 (g/10 min. @190° C.).

In still other example embodiments, the density of the lower melt index m-LLDPE resin ranges from about 0.900 g/cc to about 0.940 g/cc, with a preferred density of about 0.918 g/cc.

According to example embodiments, the thickness of the layer comprising the lower melt index m-LLDPE resin varies from about 5 percent to about 50 percent of the total film thickness, with a preferred thickness of about 35 percent.

In still further embodiments, the lower MI m-LLPDE resin is blended with other resins, including, but not limited to, other polyethylenes, polyethylene copolymers, polypropylenes, and polypropylene copolymers.

According to further example embodiments, the remaining layers of the film are resins comprised of polyethylene, polyethylene copolymers, metallocene catalyzed polypropylenes, polypropylene copolymers, or blends thereof. In some embodiments, the remaining layers have identical compositions. In other embodiments, the remaining layers have different compositions.

In still further embodiments, the melt index of the resins selected for the remaining layers ranges from about 0.5 to about 12 (g/10 min. @190° C.), with a preferred melt index ranging from about 3 to about 5 (g/10 min @190° C.). According to other embodiments, the density of the resins selected for the remaining layers ranges from about 0.850 g/cc to about 0.969 g/cc, with a preferred density of about 0.912 g/cc.

According to still other embodiments, a five-layer film, comprising two external layers and three internal layers, is provided. According to example embodiments, at least one internal layer comprises an m-LLDPE with LCB resin blended with a lower density m-LLDPE resin. In example embodiments, the thickness of the internal layer comprising the m-LLDPE with LCB resin blended with the lower density m-LLDPE resin varies from about 5 percent to about 70 percent of the total film thickness, with a preferred thickness of about 50 percent.

According to other example embodiments, the melt index of the m-LLDPE with LCB resin ranges from about 0.2 to about 8.0 (g/10 min. @190° C.), with a preferred melt index ranging from about 0.3 to about 3.0 (g/10 min. @190° C.). In alternative embodiments, the preferred melt index is about 0.5 (g/10 min. @190° C.).

In further example embodiments, the density of the m-LLDPE with LCB resin ranges from about 0.900 g/cc to about 0.940 g/cc, with a preferred density of about 0.912 g/cc. In still further embodiments, the m-LLDPE with LCB resin is combined with other resins, including, but not limited to, other polyethylenes, polyethylene copolymers, polypropylenes, and polypropylene copolymers. In still other embodiments, the internal layer comprises of a polymer produced using a higher alpha-olefin comonomer.

According to example embodiments, at least one of the remaining internal layers comprises a lower MI m-LLDPE resin. In further embodiments, the thickness of this internal layer varies from about 5 percent to about 50 percent of the total film thickness, with a preferred thickness of about 35 percent. According to other embodiments, the melt index of the lower melt index m-LLDPE resin ranges from about 0.2 to about 6.0 (g/10 min. @190° C.), with a preferred melt index ranging from about 0.5 to about 3.0 (g/10 min. @190° C.). In alternative embodiments, the preferred melt index is about 1.5 (g/10 min. @190° C.). In still further embodiments, the density of the lower melt index m-LLDPE resin ranges from about 0.900 g/cc to about 0.940 g/cc, with a preferred density of about 0.918 g/cc.

According to further example embodiments, the lower MI m-LLPDE resin is combined with other resins, including, but not limited to, other polyethylenes, polyethylene copolymers, polypropylenes, and polypropylene copolymers. In other example embodiments, the internal layer comprises a polymer produced using a higher alpha-olefin comonomer.

According to other example embodiments, the remaining layers of the five-layer film are resins, including but not limited to polyethylene, polyethylene copolymers, metallocene catalyzed polypropylenes, polypropylene copolymers, or blends thereof. In some embodiments, the remaining layers of the film have the same composition. In other embodiments, the remaining layers have different compositions.

According to example embodiments, the melt index of the resins selected for the remaining layers of the five-layer film ranges from about 0.5 to about 12 (g/10 min @190° C.), with a preferred melt index ranging from about 3 to about 5 (g/10 min. @190° C.). In further embodiments, the density of the resin selected for the remaining layers ranges from about 0.850 g/cc to about 0.969 g/cc, with a preferred density of about 0.912 g/cc.

According to embodiments disclosed herein, the m-LLDPE with LCB resin provides the stretch film with increased stretch resistance and decreased susceptibility of failure from tear propagation.

According to certain example embodiments, the lower density m-LLDPE resin provides the puncture and toughness for the film.

As disclosed in embodiments herein, the combination of the m-LLDPE with LCB resin and the lower density m-LLDPE resin results in the unexpected outcome of a film with improved properties, resulting in a high performance cast stretch film.

In still further example embodiments, the lower melt index m-LLDPE resin provides good load holding force and toughness. In example embodiments, the combination of m-LLDPE with LCB resin and lower density m-LLDPE resin in at least one layer, along with lower melt index m-LLDPE resin in at least one other layer, results in a film with improved properties over any of the resins alone.

Referring generally to FIG. 1, the steps 100 for producing an oriented cast film, according to an embodiment of the present disclosure, are illustrated. Specifically, the steps comprise producing a film from molten resins 110, gauging the film 120, oscillating the film 130, longitudinally slitting the film into multiple sections 140, and winding the film onto a film roll 150. In some embodiments, all of the steps are performed along a single production line. However, it is contemplated that the steps are performed in a different order, and one or more steps may be eliminated without departing from the scope of the present disclosure.

Figure 2:
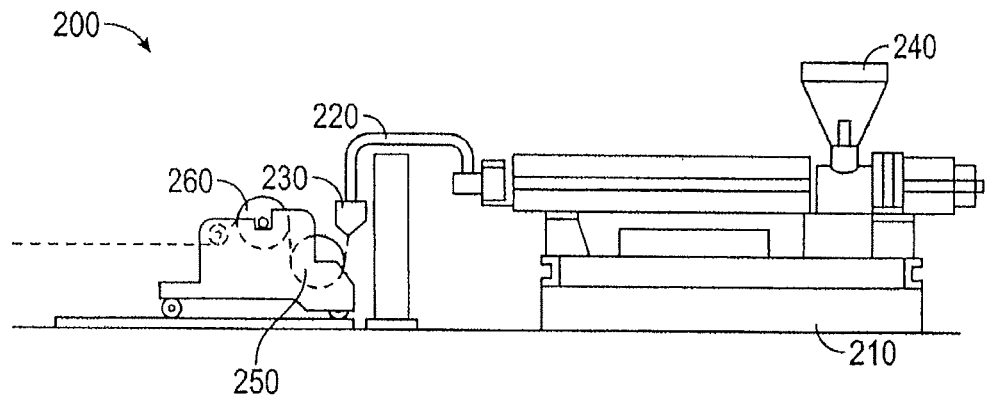
FIG. 2 illustrates a means for producing a cast power stretch film from molten resins, according to still further embodiments.

As shown in FIG. 2, a means for producing a film from molten resins 200 comprises one or more extruders 210 connected by transfer pipes 220 to a die 230. The number of extruders 210 used in the apparatus depends upon the desired composition of the film. In example embodiments, to produce a three-layer film, three extruders 210 are used. In another example embodiment, to produce a five-layer film, three, four, or even five extruders 210 are used.

According to example embodiments, the extruders 210 are connected to a source 240 of stock resins. The extruders 210 heat the stock resins to a molten condition and deliver the molten resins to the die 230 through the transfer pipes 220. In example embodiments, the film is extruded through the die 230 onto a casting roll 250. In example embodiments, the casting roll 250 is a 30-inch diameter matte casting roll with a set temperature. As a further example embodiment, the set temperature of the casting roll ranges from about 75° F. to 100° F., with a preferred value of about 90° F.

In other example embodiments, the film moves from the casting roll 250 to a secondary chill roll 260. According to example embodiments, the secondary chill roll is a 20-inch diameter mirror finish secondary chill roll with a set temperature. As a further example embodiment, the set temperature of the secondary chill roll ranges from about 65° F. to 90° F., with a preferred value of about 85° F.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions are also made without departing from the spirit or scope thereof.

The invention claimed is:

1. A cast stretch film comprising:
a first core layer, a second core layer, a first skin layer, and a second skin layer,
wherein said first core layer of said cast stretch film comprises a metallocene linear low density polyethylene (m-LLDPE) with incorporated long chain branching (LCB) resin and a lower density m-LLDPE resin; and said second core layer comprises a lower melt index m-LLDPE resin having a melt index of no more than about 1.8 (g/10 min. @190° C.),
further wherein said first core layer and said second core layer are located between said first skin layer and said second skin layer.

2. The cast stretch film of claim 1, wherein said first core layer further comprises at least one additional resin chosen from the group consisting of polyethylenes, polyethylene copolymers, polypropylenes, and polypropylene copolymers.

3. The cast stretch film of claim 1, wherein the metallocene linear low density polyethylene (m-LLDPE) with incorporated long chain branching resin has a melt index ranging from about 0.2 to about 8.0 (g/10 min. @190° C.).

4. The cast stretch film of claim 3, wherein the metallocene linear low density polyethylene (m-LLDPE) with incorporated long chain branching resin has a melt index ranging from about 0.3 to about 3.0 (g/10 min. @190° C.).

5. The cast stretch film of claim 3, wherein the metallocene linear low density polyethylene (m-LLDPE) with incorporated long chain branching resin has a melt index of about 0.5 (g/10 min. @190° C.).

6. The cast stretch film of claim 1, wherein the metallocene linear low density polyethylene (m-LLDPE) with incorporated long chain branching resin has a density ranging from about 0.900 g/cc to about 0.940 g/cc.

7. The cast stretch film of claim 6, wherein the metallocene linear low density polyethylene (m-LLDPE) with incorporated long chain branching resin has a density of about 0.920 g/cc.

8. The cast stretch film of claim 1, wherein the lower density m-LLDPE resin has a melt index ranging from about 2.0 to about 6.0 (g/10 min. @190° C.).

9. The cast stretch film of claim 8, wherein the lower density m-LLDPE resin has a melt index of about 3.5 (g/10 min. @190° C.).

10. The cast stretch film of claim 1, wherein the lower density m-LLDPE resin has a density ranging from about 0.900 g/cc to about 0.915 g/cc.

11. The cast stretch film of claim 10, wherein the lower density m-LLDPE resin has a density of about 0.912 g/cc.

12. The cast stretch film of claim 1, wherein the lower melt index m-LLDPE resin has a melt index of about 1.5 (g/10 min. @190° C.).

13. The cast stretch film of claim 1, wherein the lower melt index m-LLDPE resin has a density ranging from about 0.900 g/cc to about 0.940 g/cc.

14. The cast stretch film of claim 1, wherein the lower melt index m-LLDPE resin has a density of about 0.918 g/cc.

15. A cast stretch film comprising:
a first skin layer, a second skin layer, a first core layer, and a second core layer; said first core layer adjacent to the second core layer and interior to the first skin layer;
wherein said first core layer comprises a metallocene linear low density polyethylene (m-LLDPE) with incorporated long chain branching (LCB) resin and a lower density m-LLDPE resin; said second core layer comprises a lower melt index m-LLDPE resin having a melt index of no more than about 1.8 (g/10 min. @190° C.); and said first skin layer and said second skin layer comprise at least one resin chosen from the group consisting of polyethylenes, polyethylene copolymers, polypropylenes, and polypropylene copolymers,
further wherein said second core layer is located interior to said second skin layer.

* * * * *